Patented June 13, 1944

2,351,258

UNITED STATES PATENT OFFICE 2,351,258

RECOVERY OF WATER-SOLUBLE SALTS OF CARBOXYALKYL CELLULOSE

Richard D. Freeman and Robert C. Anthonisen, Midland, Mich., assignors to The Dow Chemical Company, Midland, Mich., a corporation of Michigan No Drawing. Application December 16, 1942, Serial No. 469,220

3 Claims. (Cl. 260—232)

This invention relates to water-soluble salts of carboxyalkyl cellulose and more particularly to the recovery thereof from aqueous solution.

The commercial preparation of the water-soluble salts of carboxyalkyl cellulose is usually carried out by reacting an alkali cellulose with a salt of a halo-aliphatic acid. Illustrative of the method is the preparation of a water-soluble sodium salt of carboxymethyl cellulose, i. e. sodium cellulose glycolate, by reacting alkali cellulose with sodium monochloroacetate as described in U. S. Patent 2,278,612. In this and other variations of the general method mentioned, as well as in certain other methods, a reaction product is usually obtained which contains the water-soluble salt of the carboxyalkyl cellulose mixed with other water-soluble salts, such as a metal halide and unreacted portions of the salt of the halo-aliphatic acid and of the alkali cellulose used. Minor amounts of water-soluble or of water-insoluble by-products formed during the reaction may also be present. The reaction product is also usually strongly alkaline in nature due to the use in the reaction mixture of an excess of alkali over that required to form the alkali cellulose and to react with the halogen acid formed during the reaction.

One method which has been used for recovering the water-soluble salt of the carboxyalkyl cellulose from such reaction products consists in adding water to the reaction product to dissolve the water-soluble compounds, neutralizing the excess alkali with acid, filtering to remove insoluble matter and precipitating the water-soluble salt of the carboxyalkyl cellulose by adding alcohol to the aqueous filtrate. However, the last step of the recovery process, i. e. the precipitation of the carboxyalkyl cellulose compound with alcohol, is commercially impractical as heretofore carried out because of the large amount of alcohol which must be added and the attendant cost of its recovery. Thus, the reaction product must be dissolved in sufficient water to reduce the concentration of the water-soluble salt of the carboxyalkyl cellulose to from 1 to 3 per cent by weight or the solution will be too viscous to handle, and the resultant dilute solution must then, after neutralization and filtration, be diluted with at least about an equal weight of alcohol to precipitate the carboxyalkyl cellulose compound in filterable form. Although a large proportion of the carboxyalkyl cellulose compound may be precipitated with a somewhat smaller amount of alcohol, the precipitate is invariably slimy and difficult if not impossible to filter due, in part, to the high degree of hydration of the carboxyalkyl cellulose compound. Only when an amount of alcohol, at least about equal in weight to the aqueous solution, is used, is the carboxyalkyl cellulose compound precipitated in a fibrous, filterable form. Thus, this method of recovery requires the use of from 35 to 100 parts by weight of alcohol for each part of water-soluble salt of carboxyalkyl cellulose.

It has now been discovered that the amount of alcohol required to precipitate a water-soluble salt of a carboxyalkyl cellulose in filterable form from its aqueous solution may be greatly reduced by acidifying the solution to a pH of 1 or lower and then neutralizing the acid solution to a pH of at least 6 before adding the alcohol. The amount of alcohol required may thus be reduced by 50 per cent or more and the volume of liquid required to be handled may be reduced by at least 20 per cent with a corresponding increase in the amount of product which may be processed in a given apparatus. The character and filterability of the carboxyalkyl cellulose compound is equal to that obtained by the conventional procedure using the larger amount of alcohol but without the acidification and neutralization steps as just described.

Although the method of the invention is of special value when applied to the reaction product resulting from the reaction of an alkali cellulose with a salt of a halo-aliphatic acid, and will be described with particular reference to the recovery of sodium cellulose glycolate from the reaction product obtained by the reaction of alkali cellulose with sodium chloroacetate substantially as by the method of U. S. Patent 2,278,612, it will be apparent from the following description that the method may be applied with equal success to the recovery from aqueous solution, regardless of the origin of the solution, of any water-soluble salt of any carboxyalkyl cellulose, such as the water-soluble salts of carboxymethyl cellulose, carboxyethyl cellulose, carboxypropyl cellulose, etc. The degree of substitution of the carboxyalkyl cellulose and its intrinsic viscosity are immaterial provided the former is such that the salt which it is desired to recover is water-soluble.

In practicing the invention, the mixture containing the sodium cellulose glycolate, such as the reaction mixture resulting from its preparation, is dissolved in sufficient water to obtain a solution sufficiently fluid to be handled easily. The amount of water used will depend to some extent on the intrinsic viscosity of the glycolate. Thus, if the mixture contains sodium cellulose glycolate of high intrinsic viscosity, it may be necessary to use sufficient water to produce a solution containing not more than about 0.75 to 2 per cent by weight of the glycolate while with a lower viscosity product only enough water to produce a 3 to 4 per cent solution may be used. The solution of the sodium cellulose glycolate may be neutralized to a pH of about 7 and any insoluble matter removed by centrifuging or filtering. If desired, the insoluble matter may be removed prior to the neutralization provided no further insoluble matter is formed during the neutralization.

The clarified solution is then acidified, preferably with a mineral acid, e. g. sulfuric acid, hydrochloric acid, phosphoric acid, etc., to a pH of about 1 or lower. During the acidification, there is little, if any, tendency for cellulose glycolic acid to precipitate, except when the latter is non-uniformly substituted or of a low degree of substitution, although the solution may become somewhat opalescent. After the desired degree of acidification has been accomplished, sufficient alkali metal hydroxide, sodium carbonate, sodium bicarbonate, etc. may be added, preferably in the form of a concentrated solution, to neutralize the solution to a pH of at least 6, and preferably to a pH of at least 6.5. Sufficient alkali is used to neutralize substantially all of the mineral acid used in lowering the pH of the solution from 7 to about 1 or lower. Any cellulose glycolic acid precipitated during the acidification is dissolved during the neutralization. The addition of more than enough alkali to raise the pH of the solution to above 6.5 to 7 is not detrimental to the operation of the process, but is unnecessary and, therefore, uneconomical. The acidification and neutralization steps are preferably carried out at temperatures below 50° to 75° C. since at higher temperatures some degradation and consequent lowering of the intrinsic viscosity of the sodium cellulose glycolate may occur, although if such degradation is not objectionable, higher temperatures may be employed.

The neutralized solution may then be treated with at least 0.4, and preferably with from 0.4 to 0.6 of its weight of alcohol to precipitate the sodium cellulose glycolate. The neutralized solution and the alcohol may be mixed in any desired order. Although it is preferable to add the alcohol as soon as convenient after the neutralization step has been carried out, it is not necessary unless an excess of alkali has been added during the neutralization and the solution has a pH higher than 7 to 8. In the latter instance, there may be some tendency for the sodium cellulose glycolate to become hydrated in the presence of the alkali and, as a result, for the precipitate to be somewhat slimy and difficult to filter unless a larger quantity of alcohol is used. Solutions which have been neutralized to a pH of from 6 to 7 may be caused to stand for several days without in any way altering the quality or filterability of the precipitate formed upon subsequently adding the alcohol. Although the precipitation may be carried out conveniently with 95 per cent ethanol, other water-soluble monohydric alcohols, such as methanol, propanol, and isopropanol, may be used. Agitation is preferably maintained during the mixing of the alcohol and the neutralized solution. Larger proportions of alcohol may be used if desired, although little advantage is gained thereby.

After the alcohol and the neutralized solution have been mixed, the precipitated sodium cellulose glycolate may be filtered from the solution, washed with 60 per cent alcohol and then dried. The precipitate may be dried in any convenient manner, such as by subjecting it to a current of air heated to 105° C. The precipitated sodium cellulose glycolate is a white fibrous product which filters rapidly. The dried product is from 98 to 100 per cent soluble in water. The recovery of sodium cellulose glycolate from its aqueous solution by the method of the invention is substantially quantitative.

Certain advantages of the invention may be seen from the following examples which are merely by way of illustration and are not to be construed as limiting.

EXAMPLE 1

Recovery of sodium cellulose glycolate

Sodium cellulose glycolate was prepared substantially as by the method of U. S. Patent 2,278,612 using a high viscosity type of cotton linters, monochloroacetic acid and an excess of sodium hydroxide. The reaction product had the approximate composition:

|  | Per cent |
|---|---|
| Sodium cellulose glycolate | 16 |
| Sodium chloride | 5.1 |
| Sodium hydroxide | 11.7 |
| Sodium chloroacetate | 9.8 |
| Sodium glycolate | 8.4 |
| Water-insoluble residue | 5.3 |
| Water | 43.7 |

100 parts by weight of the reaction product was stirred with 1440 parts of water at about 25° C. until all soluble salts were dissolved. The solution was turbid, and slightly viscous and contained about 1.04 per cent by weight of dissolved sodium cellulose glycolate. The solution was neutralized to a pH of 6.5 with 36 per cent hydrochloric acid and then centrifuged to remove insoluble matter. The clarified solution was acidified to a pH of 0.6 with concentrated hydrochloric acid and then neutralized to a pH of 7 with 50 per cent aqueous sodium hydroxide. 95 per cent ethanol equal to about half the weight of the neutralized solution was then added and, after mixing, the precipitated sodium cellulose glycolate was removed by filtration and washed with 60 per cent aqueous alcohol. The precipitated glycolate was fibrous in nature and filtered readily. The washed precipitate was dried in air at about 105° C. The dried product was a white fibrous mass and was about 99 per cent soluble in water. The recovery was substantially quantitative.

In a comparative experiment, alcohol was added directly to the clarified solution omitting the acidification and neutralization steps. Twice the proportion of alcohol was required in this instance to produce a fibrous, easily filterable precipitate of sodium cellulose glycolate as was required when the solution had first been acidified to a pH of 0.6 and then neutralized to a pH of 7.

EXAMPLE 2

Effect of degree of acidification on the subsequent precipitation of sodium cellulose glycolate A solution containing about 1 per cent by weight of sodium cellulose glycolate was prepared by dissolving a portion of a reaction product similar to that used in Example 1 in water, neutralizing the solution to a pH of 6.4 and centrifuging. The solution was divided into several equal portions, a number of which were acidified to varying degree with concentrated hydrochloric acid. The portions were then each neutralized to a pH of 6.5 and 95 per cent ethanol, equal to half the weight of the portion before the acidification, was then added to each. For comparative purposes, one of the portions was treated directly with alcohol without first being acidified and then neutralized. After the addition of the alcohol, each of the portions was examined to determine the nature and filterability of the precipitated sodium cellulose glycolate. The pH to which each portion was acidified and the nature of the precipitate formed upon the addition of the alcohol are given in the accompanying table.

TABLE

*Relation of degree of acidification to nature of precipitate*

| pH before neutralization | Nature of precipitate |
|---|---|
| 6.4 (not acidified) | No precipitate formed. |
| 4.2 | ......do...... |
| 2.3 | Precipitation incomplete—precipitate slimy and impossible to filter. |
| 2.0 | Do. |
| 1.0 | Precipitation complete—precipitate soft—filters slowly. |
| 0.5 | Precipitation complete—precipitate firm, fibrous and easily filtered. |

We claim:

1. The method of recovering a water-soluble alkali metal salt of a carboxyalkyl cellulose in readily filterable form from an aqueous solution thereof, which comprises acidifying the solution to a pH of less than 1, then neutralizing the acidified solution with an alkali, adding a water-soluble monohydric alcohol to the neutralized solution in amount sufficient to precipitate completely the salt of the carboxyalkyl cellulose, and separating the precipitated salt from the solution by filtration.

2. The method according to claim 1 in which the water-soluble salt of a carboxyalkyl cellulose to be recovered is the sodium salt of carboxymethyl cellulose, and the alkali employed for neutralizing the acidified solution is sodium hydroxide.

3. The method according to claim 1 in which the water-soluble sodium salt of carboxymethyl cellulose is recovered from an aqueous solution of the reaction product of sodium cellulose and sodium monochloroacetate.

RICHARD D. FREEMAN.
ROBERT C. ANTHONISEN.